United States Patent [19]
Harris

[11] Patent Number: 5,695,789
[45] Date of Patent: Dec. 9, 1997

[54] APPARATUS FOR EXTRUSION OF AN ARTICLE OF VARYING CONTENT

[75] Inventor: Holton E. Harris, Westport, Conn.

[73] Assignee: Harrel, Inc., Norwalk, Conn.

[21] Appl. No.: 477,436

[22] Filed: Jun. 7, 1995

[51] Int. Cl.⁶ .................................................. B29C 47/92
[52] U.S. Cl. ............... 425/131.1; 425/141; 425/145; 425/205
[58] Field of Search ............... 425/131.1, 133.1, 425/141, 140, 145, 205, 209, 462; 264/40.7, 173, 209.1, 209.4, 211.23, 40.3

[56] References Cited

U.S. PATENT DOCUMENTS

| | | | |
|---|---|---|---|
| 4,171,193 | 10/1979 | Rahlfs | 425/145 |
| 4,209,476 | 6/1980 | Harris | 264/40.4 |
| 4,305,703 | 12/1981 | Lupke et al. | 425/72.1 |
| 4,515,738 | 5/1985 | Anders | 425/145 |
| 4,613,471 | 9/1986 | Harris | 264/40.1 |
| 4,693,855 | 9/1987 | Herbert | 264/40.7 |
| 4,721,589 | 1/1988 | Harris | 425/145 |
| 4,828,770 | 5/1989 | Fabian et al. | 264/40.3 |
| 5,078,930 | 1/1992 | Herrington | 425/72.1 |
| 5,128,076 | 7/1992 | Akselrod et al. | 425/140 |
| 5,128,077 | 7/1992 | Stevenson et al. | 425/141 |
| 5,179,521 | 1/1993 | Edge | 425/145 |

FOREIGN PATENT DOCUMENTS

| | | | |
|---|---|---|---|
| 59-81602 | 5/1984 | Japan | 264/16 |
| 63-17025 | 1/1988 | Japan | 425/131.1 |
| WO94/16873 | 8/1994 | WIPO | |

OTHER PUBLICATIONS

Harrel Incorporated—Four Extruder, Four Gear Pump Sheet Co-extrusion Installation, 1982, per attached photograph.
"The Geartruder—A Powerful New Tool for the Plastics Extrusion Industry," Harrel, Incorporated. Undated.
"The Geartruder by Harrel," Harrel, Incorporated. Undated.
"Melt Pump Systems for Extruders by Harrel," Harrel, Incorporated. Undated.

Primary Examiner—Khanh P. Nguyen
Attorney, Agent, or Firm—Brumbaugh, Graves, Donohue & Raymond

[57] ABSTRACT

A coextrusion system employs two or more extruders, each with a gear pump at its output connected to a coextrusion die. Different materials are extruded by each extruder. Varying the speed of one or both gear pumps varies the content of the extrudate. The gear pumps permit precise variation of the relative content of the materials extruded by the several extruders lengthwise along the extrudate. A display of a cross sectional dimension of the extrudate along a length of the extrudate permits observation of the lag that occurs between alteration of gear pump speed (or air pressure in the case of tubular or blown sheet extrudates) and the resultant change in dimension, so that a speed correction can be made at the appropriate time to compensate for differing shrinkage and stretching characteristics between the several extruded materials.

33 Claims, 4 Drawing Sheets

APPARATUS FOR EXTRUSION OF AN ARTICLE OF VARYING CONTENT

BACKGROUND OF THE INVENTION

This invention relates to methods and apparatus for coextrusion of products formed of at least two differing materials, and more particularly to methods and apparatus employing two or more extruders, each with a gear pump, to coextrude an extrudate that varies along its length in the relative proportion of differing constituent materials.

Tubes, pipe, sheet, film, profiles and other extruded products made of plastic, for example, have different characteristics that depend on the particular plastic being used. One plastic will be very flexible, while another will be very stiff. One may be transparent, while another is opaque, etc. For many applications it would be desirable to make an extruded product that is a coextrusion of two or more materials that changes from one material to another abruptly or gradually or that varies along its length in the relative content of the two or more constituent materials.

Coextrusion is a process by which two or more extruders are connected to a single, coextrusion die. The individual extruders feed to the die differing materials, by differing materials is meant not just different types of materials such as nylon and polyurethane, but materials of differing characteristics or qualities, such as color, opacity or density. The extrudate from the coextrusion die is, then, a multiple material extrudate. An example of a coextruded product is a tube extruded by a pair of extruders feeding a coextrusion die that directs a first material to the outside of the extruded tube and directs a second material to the inside of the tube. The result is a coaxial, two-layer, tubular extrusion.

Extruders have been connected directly to coextrusion dies, but with less than optimum results. A plastic extruder, for example, is a device that has a large barrel with a large motor driven screw in it. Plastic pellets are put into a hopper end. A molten plastic stream comes out the other end. Since the screw is an inefficient pump, it generates much friction and heat as it turns. Enough energy is converted from the mechanical energy of the screw into heat energy to melt the plastic. The plastic stream eventually gets forced through the die, forming it into garden hose, medical catheters, tubing, sheet, etc.

An extruder screw, however, is not a positive displacement pump. The amount of plastic which comes out the exit end is not exactly proportional to the speed of the screw. The throughput varies with the viscosity of the plastic, the pressure at the die and other variables.

If one varies the speeds of the extruders of a coextrusion system, one theoretically varies the amount of each of the materials in the extrudate. However, with extruders this variation cannot be precisely controlled and it is virtually impossible to change relatively quickly from one material to the other, or to vary the content so that the extrudate changes gradually in a precisely controlled fashion from one material to another. One reason for this is that the extruder is subject to considerable "drool." If an extruder screw is stopped, there is still a great deal of plastic that can come out of the grooves of the screw. Consequently, if extruders are used for the above-mentioned scheme for varying the material content along the length of the extrudate, there are several problems:

a. The inertia of the screw, motor, gear box system in an extruder is high. It is consequently very difficult to control the speed accurately or quickly.

b. The output of an extruder is not linear with speed, so it is not possible to predict what the total output from two or more extruders will be.

c. The drool from the extruders will distort the control of the percentages of each material.

d. Since the extruders react on each other through the back pressure created in the die, the output of each extruder is affected not only by what happens in that extruder, but also by what happens in all of the others. Hence, if one attempts to deliver more material from one extruder by increasing its speed, the pressure at the die increases, not just for that extruder, but for all others, reducing their output.

One way to change from one extrudate material to another is the use of a valve to effect the change. The valve allows one material to go into the die while the other is diverted and discarded in the scrap bin. The two flows can then be reversed and an extrudate varying in content results. Obviously that system is extremely wasteful.

Even if control of the amount of constituent materials is attained, these materials may have different characteristics that cause the dimensions of the extrudate to depart from those being sought. Differing amounts of shrinkage during cooling, and differing amounts of the stretch that occurs between the die and the extruder's puller can cause cross sectional dimension variations as the material content in the extruder changes.

It will thus be apparent that there exists a need for an extrusion system capable of extruding two or more materials with repeatability, stability and predictability, capable of abrupt or gradual changeover of materials and of accurate dimensional control as well as content control.

BRIEF SUMMARY OF THE INVENTION

In accordance with this invention, by the use of gear pumps, the above shortcomings are avoided in a coextrusion method and system that varies extrudate material content. Two or more extruders are employed in combination with a coextrusion die and a gear pump is interposed between each extruder and the die. The amount of each material being delivered to the die is varied by controlling the speed of each gear pump.

A gear pump is formed from two counterrotating gears which are tightly meshed. The gear pump is used on the end of the extruder and acts as a metering pump to meter out a precisely measured amount of material. The gear pump can be thought of as a group of measuring cups on a wheel. The measuring cup—in this case the pocket between the teeth of the pump is filled with material such as plastic melt at the input. It travels around the pump, getting levelled as it does so, so that the amount carried from input to output is precisely one tooth-full. At the output the gears mesh very closely, so the material cannot get back to the input, and so it exits.

This type of pump is a positive displacement pump. The amount which exits is precisely proportional to the RPM of the pump to a very close tolerance, and the pump is relatively insensitive to such factors as viscosity, pressure, etc. This gives the gear pump greater repeatability, stability, and predictability than the extruder. When an extruder stops there is still an open channel all the way back to the hopper, and material drools out. When a gear pump stops, on the other hand, there is just one tooth-full of melt from the top gear and one from the bottom that is open. The gear pump is a much smaller device. It has much less inertia. Consequently, its speed can be changed a great deal faster than that of an extruder. The upstream material is closed off firmly by the tight fit between the teeth of the gears of a gear pump and the housing of the pump. Gear pump speed control will thus accurately control the rate of delivery of material to the die. By using gear pumps between the extruders and the die of a coextrusion system, the amount of each constituent material at each location along the extrudate can be precisely controlled.

In a two extruder system, for example, the extrudate can be changed from one material to another by increasing the speed of one pump from completely stopped, while slowing the speed of the other pump to a stop. If the extrudate is to be made without dimensional change, in theory the sum of the speeds of the gear pumps should remain constant. However, different materials shrink differently with changes in temperature and consequently the cross sectional dimensions of an extrusion will change as it changes from one material to another. Compensation for this can be made by an incremental change in one of the gear pump speeds so as to either deliver more of the plastic that exhibits the higher shrinkage or to deliver less of the plastic that shrinks less.

Similarly, where stretch between the die and a puller varies from one material to another, tending to alter a cross sectional dimension, compensation can be effected in a system employing gear pumps by changing pump speed slightly, or in the case of a tube or blown film by correcting not only a pump speed, but air injected at the die.

Although this sounds relatively straightforward, in practice a change in speed of one of the gear pumps has an effect on the extrudate only after a considerable lag. That is to say, the increase in speed of one gear pump will produce a higher content of that gear pump's material only after the material intermediate the gear pumps and the die outlet has been forced through the die. In an embodiment of this invention, a laser gauge downstream of the die was used to detect a variation in dimension. A sudden temporary gear speed change will show up on a monitor that displays cross sectional dimension. The lag, in terms either of time or length along the extrudate, is determined and the shrinkage or stretch compensating correction is made in advance of the extrusion of that portion of the extrudate requiring the correction. The time or distance in advance that the correction is made is the time or distance of the measured lag. Similarly, where air is used to control outside diameter a "blip" or sudden pulse of air is introduced and the line lag to the laser gauge is noted, whereupon a correcting air input can be subsequently made at the correct location.

A coextrusion die that can make tubing with two layers is well-known in the industry. The thickness of each of the layers is proportional to the amount of plastic which goes into each of the two inputs of the die. Using this with two extruders fitted with gear pumps, catheters for use in brain surgery were made that were extremely flexible at the forward tip, but stiff in the rear portion of the catheter, enabling manipulation during entry into the body. In this case the extrudate was changed from nylon to polyurethane and back again. It was severed at the midpoint of each location of entirely one plastic. The nylon formed the rear portion of the catheters and the polyurethane the leading tip. The transition took place in about 40 inches.

Another application of the invention is the extrusion of a product that gradually changes from one color to another, or from opaque to transparent, by virtue of changing from one material to another as described. Other applications of extrusions of two or more materials and varying characteristics from one location to another will be recognized.

Unlike coextrusion systems using extruders without gear pumps as alluded to above, pressure at the die is not a factor in systems according to the present invention. The output of the gear pump is proportional to RPM essentially regardless of what happens to the pressure at the output.

There are, in fact, slight leakages within a gear pump that cause some dependence of output on back pressure, but it is very much less than in an extruder. Further, systems of this invention control not just the input pressure at the pump, but also the differential pressure across the pump. This greatly reduces the effect of back pressure. Systems with gear pumps almost always achieve volume stabilities of 0.1% or better, even in the presence of varying back pressure.

In the case where the extrudate is changed abruptly from one material to another, the problem of pressure in the extruder is made more severe. When the gear pump stops, it has the effect equivalent to closing off the output pipe from the extruder. The blockage is essentially complete, and as already noted, it is difficult to stop an extruder abruptly because of inertia.

The usual problem in extruder screw design is to minimize leakage flow in the screw. In other words, normally one wants as nearly as possible to clear out the plastic in the flights every time an extruder screw rotates. In normal screw design the problem is to do this in the face of the fact that it takes a considerable pressure—typically 2000 PSI or more—to force the plastic through the die. This pressure is generated in a normal screw by a decrease in the depth of the screw, and in an extruder the downstream portion of the screw—the metering section—has a much shallower depth than the preceding sections. The shallower depth in the downstream end allows the screw to generate more pressure.

In a system according to this invention, for abrupt material change, because there is a gear pump at the output of each extruder, one does not need to generate the pressure in the extruder screw to force the plastic through the die. The gear pump does that. Only enough pressure is needed to force the polymer through the extruder's screens and to ensure, as noted above, that the teeth of the gears in the gear pump are filled. This only takes pressure typically on the order of 300 psi. The gear pump generates the rest of the pressure to force the polymer through the die.

For this application, therefore, one can use a screw that is deliberately designed to be a poor pressure generator—for example by having the metering section with much deeper flights than normal. This would be unsuitable for use without a gear pump, but is very tolerant of increases in back pressure when the gear pump stops. Nevertheless, the extruder is not kept going any more than needed, because that would generate extra heat in the polymer. However, the gear pump can be stopped abruptly, and the extruder can be brought to a stop more gradually without the problem of extreme pressure build-up. Control of such a system is accomplished by a feedback control controlling the RPM of the extruder based on the differential pressure across the pump. This is known for example, from this inventor's U.S. Pat. No. 4,209,476, incorporated herein by reference. Because it is the gear pump that precisely controls the delivery of material to the die, the extruder speed need not be controlled accurately.

The process is applicable to any number of extruded products such as profile, sheet, blown film, tubes, pipe, etc. Although the catheter referred to above as a specific embodiment varied from 100% of one polymer from one of the gear pumps to 100% of the other polymer from the other of the gear pumps, the technique is not limited to that configuration. Other ratios and schedules of variations are apparent. Also, although it is described herein how the cross sectional dimension of an extrudate may be maintained constant by accounting for variations in shrinkage and stretch, it is not necessary that the extrudate be maintained constant in cross sectional dimension if variation in that dimension is desired.

The lag between cause and affect, as it were, can be determined and compensated for. A programmable, microprocessor-based controller like the assignee's DIGI-PANEL has a display capable of indicating in bar graphs the thickness of extrudate measured at a gauge downstream of the die and over a length of extrudate exceeding more than a complete cycle or even multiple cycles in the variations in plastic content. In the coextrusion of a plastic tube, first, it is noted when one pump is at its maximum speed. Second, the laser gauge display is observed to determine time lag between pump speed changes and changes in diameter at the laser gauge. This is the lag due to both plastic in the system between the pump and the die and the distance from the die to the laser gauge. Third, a "blip" of air change is introduced into the tube at the die and a time lag before this appears at the laser gauge is determined. Compensation for variations in extrudate dimensions due either to shrinkage or stretch can now be begun by introducing at the correct location to produce at the affected extrudate location appropriate corrective action in either speed or air pressure or both, and of course, when the extrudate varies in its content in a desired manner such as gradual increase from one plastic to another, then a program of changes to compensate for the varying dimensional effects is introduced via the controller.

The foregoing corrective action can be obtained by the operator making the above-noted observations and manually adjusting speeds and/or air pressure as indicated, or the controller program can be modified to automatically make the compensatory changes.

The assignee Harrel, Incorporated's TUBETROL control loop, operates on a principle like that described in the inventor's above-mentioned Pat. No. 4,209,476. It controls the inside and outside diameters of extruded tubing of a single material. The outside diameter is controlled by the air pressure introduced into the tube at the die. The inside diameter is a function of the relative speeds of the gear pumps and the puller. Control of the puller speed then can control the inside diameter. When it is found that the outside diameter is too small the internal air pressure is increased and the system waits until the change appears at the laser gauge. If the correction is not sufficient, it increases the air more, etc. The same time lag is present as in the coextrusion process, but because there is no change in composition affecting diameters at a particular point along the tube material variation cycle, it does not matter where along the extrudate the change is made.

Hence, an automatic closed loop control has to do just what has been described above to compensate for dimensional changes in a coextruded extrudate of changing composition. The cross sectional dimension of the entire cycle of tubing, or other extrudate, would be recorded in the memory banks of the system. In the case of a tube this would be the OD and the ID. If part of the tubing is too small, for example, instead of just gradually increasing the air, the system puts in a momentary increase in the air pressure, a "blip," large enough to have a clearly recognizable effect, but only lasting for a short period. It then monitors the profile continually for the next cycle or so and compares the value at each point with the values stored in its memory banks. There will be one point which is measurably larger than it was previously. The time lag between the "blip" in the air that was inserted in the die and the time the corresponding "blip" in diameter showed up on the laser gauge is now the raw delay. This delay can be used to correct the normal TUBETROL routine so that it takes account of the lag. Likewise, taking into account the appropriate lag the gear pump speeds can be controlled to control material-dependent changes in thickness.

The above and further objects and advantages of the invention will be better understood with respect to the following detailed description preferred embodiments considered in combination with the several figures of the accompanying drawings.

DESCRIPTION OF PREFERRED EMBODIMENTS

Figure 1:
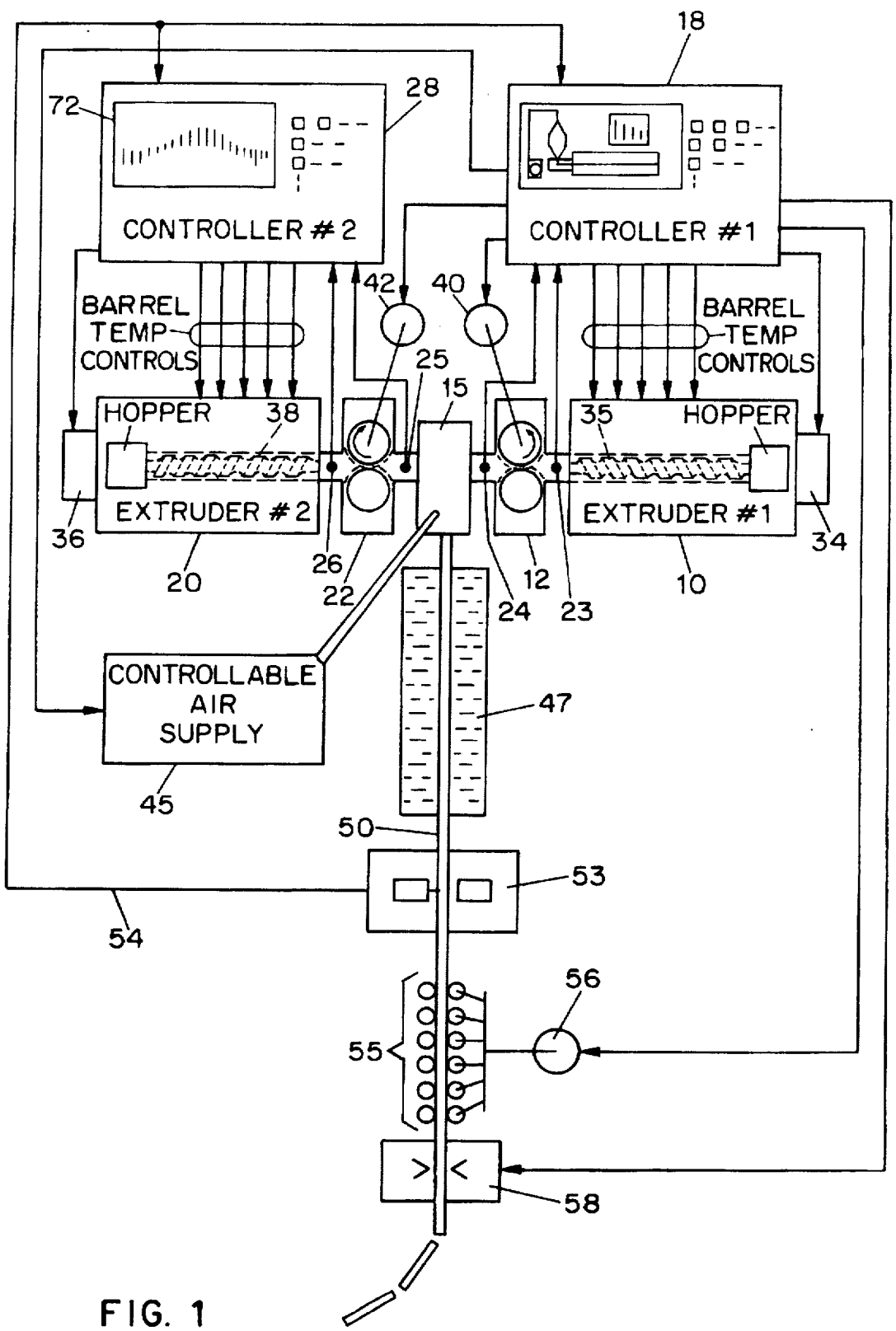
FIG. 1 is a schematic block diagram of a system for extruding products of two materials of varying content.

In FIG. 1, a first extruder 10 is connected with a gear pump 12 and a second extruder 20 is connected with a gear pump 22. A coextrusion die 15 receives the output of the two gear pumps. A first controller 18, which may be a Harrel, Incorporated CP-871 DIGIPANEL extrusion controller, controls, in a manner known in the art, the temperature along the barrel of extruder 10 and controls the speed of a screw drive motor 34 that drives a screw 35 of the extruder 10. A second controller 28 controls the temperature of the second extruder 20 at multiple zones along the extruder barrel, again as known, and controls the screw drive motor 36 that drives the screw 38 of the second extruder. The gear pump 12 is driven by a servo-motor 40 controlled by the controller 18, and likewise the gear pump 22 is driven by a servo-motor 42 also controlled by the controller 18, again as shown in FIG. 1.

A controllable air supply 45 introduces compressed air to the die 15 under control of the first controller 18. A water trough 47 receives an extrudate 50 as it emerges from the die 15 and before it passes to a laser gauge 53. The laser gauge passes a cross sectional dimension measurement of the extrudate to the two controllers 18 and 28 via a line 54. A conventional puller 55 pulls the extrudate through the water trough 47 and past the laser gauge 53. A drive motor 56 of the puller 55 is under the control of the first controller 18. A cutter 58 that severs the extrudate 50 into desired lengths at desired locations is also controlled by the controller 18. The combination extruder and gear pump 10 and 12, and 20 and 22, may be the combination of such offered by the assignee Harrel, Incorporated under the trademark GEARTRUDER.

The rate of delivery of materials, or "melt," by the gear pumps 12 and 22 to the coextrusion die 15 is directly proportional to the speed at which the pumps are driven by their servo-motors 40 and 42 under the control of the first controller 18. Variation of the speed of either gear pump will vary the content in the extrudate 50 of the material being delivered by that pump. Since the rate of delivery of material is independent of extruder speed, extruder speed control is based upon the pressures at the input and output of the gear pump as described in the aforesaid patent. These pressures are detected by detectors at 23, 24, 25 and 26 and conveyed as signals to the controllers 18 and 28.

Figure 2:
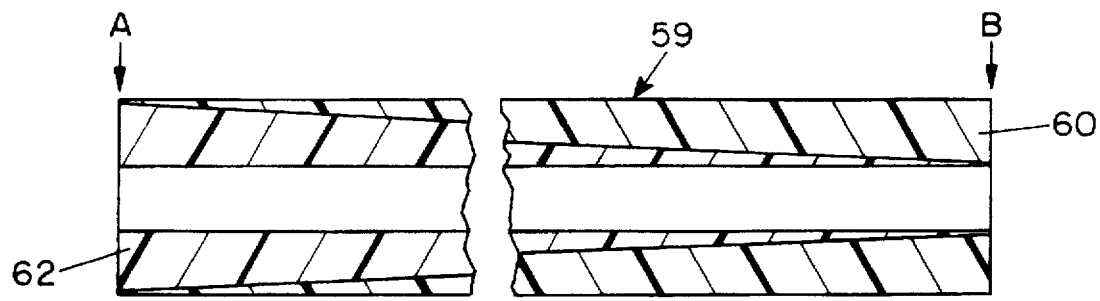
FIG. 2 is a fragmentary cross sectional drawing of an extrusion varying in content from one material to another along its length.

In FIG. 2, a tubular extrusion 59 has two coextruded plastic layers 60 and 62. The inside and outside diameters of the extrusion remain substantial constant along its length. The content of the two constituent plastics varies from a location A where the extrusion is entirely the plastic of layer 62 to a location B where the extrusion is entirely of the plastic of layer 60. Such an extrusion is produced with the system illustrated in FIG. 1 by ramping-up the gear pump 12 while ramping-down the gear pump 22 and vice versa. This alternate ramping-up and ramping-down of the two gear pumps is graphically shown in FIG. 3 in juxtaposition to a corresponding length of the extrusion which is partially shown in cross section above the plot of gear pump speed versus time.

To provide increased pressure from an extruder, ordinarily an extruder screw will have deeper flights at the input or feed zone and shallower flights at the output or metering zone. This compression ratio between the zones will ordinarily be in the range of 2 to 1 to as much as 4 to 1 or more. However, in the present system it may be 2 to 1 or less. This is possible because the gear pumps, and not the extruders, are used to deliver melt to the die. The deeper screw flights in the metering zone also allow a gear pump to stop abruptly while the extruder comes to a stop more slowly, and there is no resultant excessive build-up of pressure at the input to the gear pump.

Figure 3:
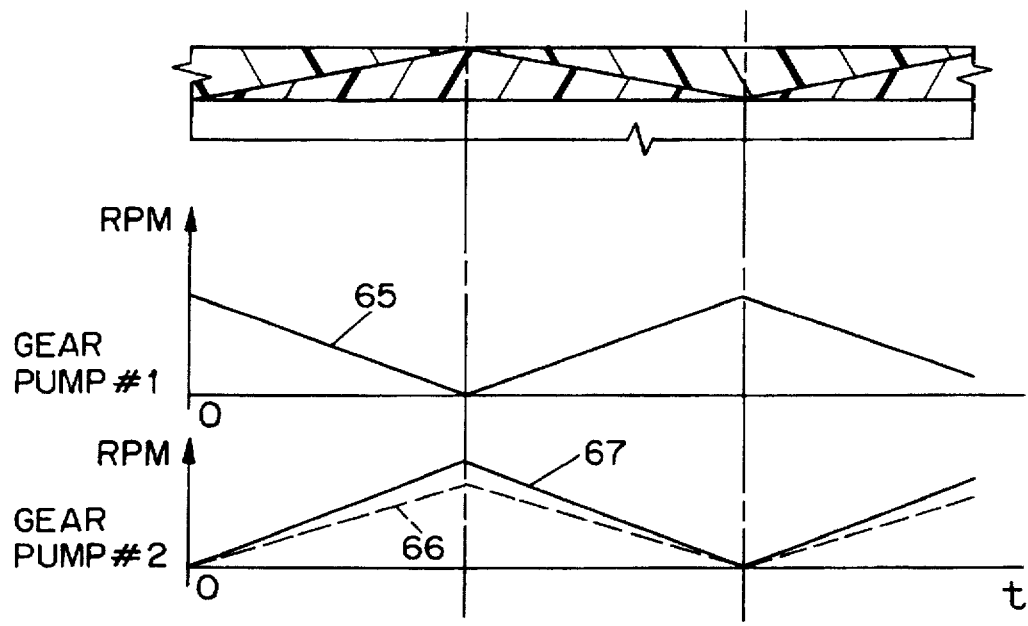
FIG. 3 is a graphical illustration of gear pump speed versus time for the two gear pumps of a system like that of FIG. 1 and producing an extrudate varying in content from one material to another along its length.

If the characteristics, such as shrinkage and stretching, that effect the cross sectional dimension of the product are the same for the two materials 60 and 62, then the gradual change-over from one material to the other with no change in the inside and outside diameters can be effected by gear pump speed variations as illustrated by solid line 65 and the broken line 66 of FIG. 3, which speeds change at exactly the same rates, but entirely out of phase such that the sum of the two speeds is always a constant. This of course assumes that the gear pumps 1 and 2 are of identical size, whereas if they vary in size a compensating speed correction is necessary in one or both to assure that their combined rate of delivery is constant.

If the cross sectional area affecting characteristics such as shrinkage or stretching differ between the two materials 60 and 62, then to maintain a constant inside and outside diameter it is necessary to make a compensatory change in the speed of one of the pumps. The FIG. 3 illustration assumes that the material delivered to the coextrusion die by the gear pump 2 shrinks more as it cools during its travel from the die through the water trough to the laser gauge and the puller. A compensatory incremental change in the speed of the gear pump 2 brings its speed to the speed illustrated by the line 67 in FIG. 3. Of course, the compensatory change in speed will need to vary as the pump 2 contributes more or less material to the extruded product, again as shown.

Although appearing straight-forward, a correction of the kind illustrated in FIG. 3 is not so easily accomplished. FIG. 3 aligns a cross section of extruded product with the plots of gear pump speed, but no such alignment exists in an extrusion system such as that of FIG. 1. Because of the inventory of material between the gear pump and the die outlet, a lag exists between an increase in speed of a gear pump and a noticeable increase in the material from that pump in the extrudate. Because of the travel distance from the die to the laser gauge, a further lag exists between the emergence of the change effected by a gear pump speed change and its detection at the laser gauge 53.

Similarly, a change in the air pressure supplied to the die 15 from the controllable air supply 45 does not appear at the laser gauge 53 until after the second period of time or second lag which is the time required for an extrudate location to move from the die to the gauge.

Figure 4:
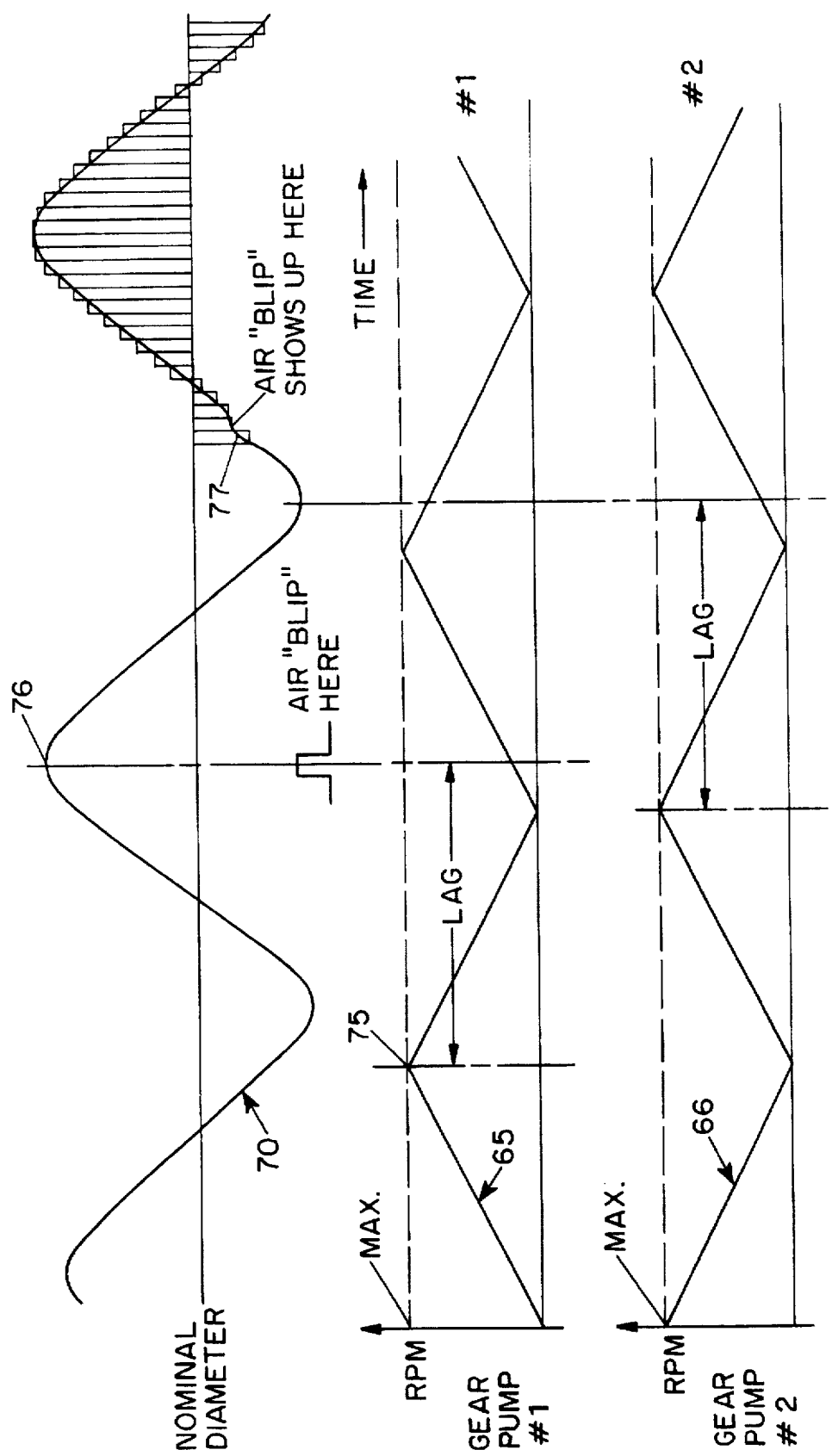
FIG. 4 is a graphical illustration that plots diameter variation, gear pump and the speed of two gear pumps against time for an extrudate varying in content but not changing entirely from one material to another along its length.

FIG. 4 illustrates the relationship between the gear pump speed changes and the extrudate diameter for an extrudate like that illustrated at FIG. 2. Again the plot of gear pump speed versus time for the first gear pump is designated 65 and the plot of uncorrected speed for the second gear pump is designated 66. Above those plots appears a plot 70 of outside diameters measured by the laser gauge 53 and displayed on a display 72 of the second controller 28 illustrated in FIG. 1.

When one of the two extruders 10 and 20 is providing a soft material such as a soft polyurethane while the remaining extruder is supplying a harder material such as nylon 11, if the air pressure introduced by the supply 45 inside the extruded tube and a ratio of the puller 55 speed to the gear speeds are maintained the same for both polymers, the tubing dimensions will vary as the tube varies from one composition to the other. The stretch imparted to the tube by the rolls of the puller 55 differs from the one plastic to the other. Moreover, the air that is introduced into the extruded tube to establish the outside diameter "blows-up" the tube a varying amount as the material content of the tube varies."

In the TUBETROL process of the assignee of this invention, both the inside and outside diameter of tubing is controlled as the tubing is extruded. A laser gauge like the gauge 53 is used to monitor the outside diameter of the tube and by feedback the controller varies the air pressure inside the tube to restore the outside diameter to its proper value if a departure is observed. The inside diameter is controlled by varying the ratio of the speed of the puller to the speed of the gear pump.

When a gear pump is used, the output volume is proportional to the speed of the pump to very close tolerances. The volume per hour of the gear pump-equipped extruder therefor is determined by the speed of the pump. The length per unit time of extrudate produced is proportional to the speed of the puller. Maintaining the ratio of the pump speed to the puller speed constant maintains the ratio:

$$\frac{\text{VOLUME/HR}}{\text{FT/HR}}$$

In this ratio, the time cancels out, leaving: VOLUME/FT. The volume per foot, however, is the cross sectional area. Consequently, controlling the volume per foot and the outside diameter clearly controls the inside diameter too.

Using a gear pump, one knows the volume of a given length of tube because it is dependent on the speed of the pump, which one knows. And using a laser gauge the outside diameter is known. Consequently, such a system can be calibrated in ID, and the ID can be controlled even if it cannot be measured directly. This system operates well for tubes of a single constituent. However, where two materials are employed in a coextrusion process to alter the content of the extrudate along the length thereof, and where the two materials have differing characteristics, correction in this manner is complicated by the lag that occurs between the corrective action and the occurrence of the correction in the extrudate.

The above-referenced DIGIPANEL controller of Harrel, Incorporated can display inside and outside diameters as a series of bar graphs as indicated towards the right end of plot 70 of outside diameters in FIG. 4. These have been simplified into a single curve throughout the remainder of the plot. The maximum speed of the first gear pump 12, which is point 75 on plot 65 in FIG. 4 corresponds to the maximum diameter point 76 on the plot 70 of diameters measured by the laser gauge 53. The lag is shown to be greater than the length of one complete change-over of material in the extrudate, and it may be much longer than this for an extrudate of very small cross section.

With several factors possibly acting to vary the dimension measure by the laser gauge and without knowing what point on a given display corresponds to what point in the varying speeds of the pumps, it is not immediately apparent how to correct undesired dimensional changes.

A brief pulse of increased air-pressure introduced at a point corresponding to point 76 in the extrusion does not show up in the display until point 77. Consequently, it becomes apparent that it is not easy to alter gear pump speed to compensate for changes in inside diameter occasioned by changes in material content in the extrusion. Likewise, it is not so simple to change the air pressure to compensate for observed changes in an outside diameter.

Such compensation can be accomplished, however, after determining the lag between cause and affect, so to speak. By noting the lag between the introduction of the air "blip" at a point corresponding to point 76 and the appearance in the display of its affect at point 77, the lag between the die and the laser gauge is determined. As will be appreciated, this lag represents the movement of the extrudate from the point of introduction of the air blip at the die to the location of the laser gauge. It is somewhat shorter than the lag between a gear pump speed change and its appearance at the laser gauge. The latter includes the time lapse between the speed increase and the effect on the extrudate at the die plus the time it takes for this effect to move from the die to the laser gauge as pointed out above. Likewise, by noting the delay between a gear pump speed change and its effect on the displayed diameters it is possible to determine when gear pump speed should be changed to cause a correction in the appropriate point along the extrudate.

The system can be used, in addition, to control the thickness of the tube of different materials without changing the proportional content. In this case, the thickness of the wall vs the distance along the tube is calculated and displayed. Then when variations in thickness are noted, a correction term is inserted into the speed control of the puller to increase or decrease the thickness, as required. As a practical matter, it should be noted that when the RPM of the puller is changed, it is almost always necessary to change the air too. In other words, it becomes necessary to correct both the air and the puller.

An example of an actual run of the system of FIG. 1 to make the above-mentioned catheter product was as follows:

|  | Extruder #1 & Gear Pump | Extruder #2 & Gear Pump |
|---|---|---|
| Barrel Zone #1 | 360° F. | 390° F. |
| Barrel Zone #2 | 370 | 410 |
| Barrel Zone #3 | 370 | 420 |
| Head Zone | 380 | 440 |
| Zone 5 not used |  |  |
| Adapter Zone 6 | 390 | 430 |
| Gear pump Zone 7 | 390 | 420 |
| Adapter Zone 8 | 390 | 420 |
| Zone 9 not used |  |  |
| Die Zone 10 | 430 |  |

The melt temperature out of the first gear pump was 390° and out of the second was 433°.
Head Pressure was 1170 psi.
Inlet pressure to pump was 960 psi.
Discharge pressure from pump was 680 psi.
The air pressure required was very low at all times—below 10 inches of water.
Extruder #1 was running polyurethane and extruder #2 was running Nylon 11.

When the system was run without any correction, making nominally 41 mil tubing, the difference between the diameters of the nylon and the urethane was about 13 mils. With a half hour or so of adjustment by the operator as described, this was reduced to less than 1 mil difference.

Figure 5:
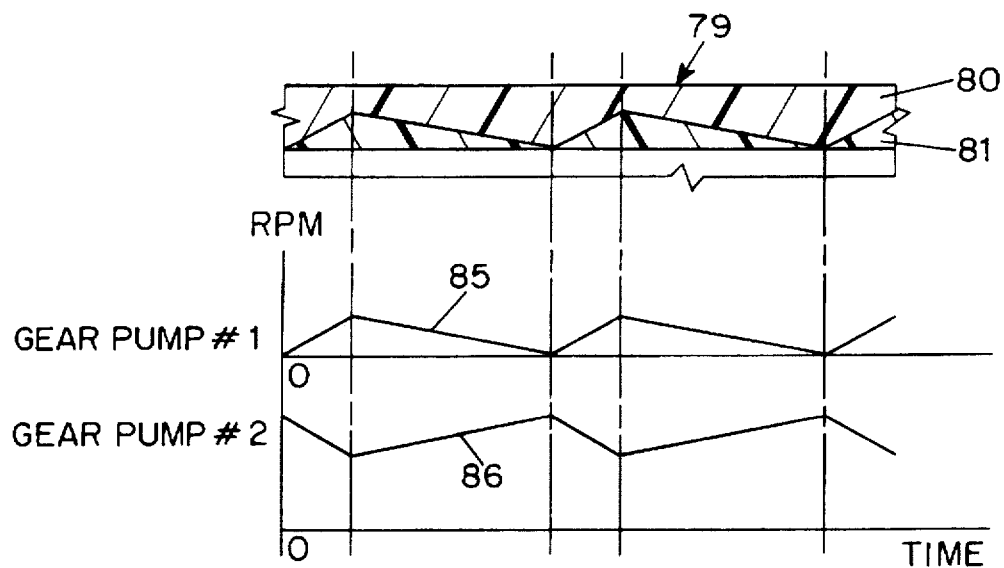
FIG. 5 is a graphical illustration like FIG. 2 for an extrudate varying in its constituent content along its length, but without changing entirely from one material to another.

Although an extrudate changing entirely from one material to another has been discussed, it is clear that a coextrusion wherein the proportions of the two constituent materials change less than entirely along the length of the extrudate is quite possible using the system of FIG. 1. FIG. 5 shows a partial cross section of a tube 79 in juxtaposition with a plot of the speeds of the first and second gear pumps such as might be used to produce such an extrusion. The extrusion 79 is of two plastics 80 and 81. The plot 85 of the speed of the first gear pump versus time corresponds to the delivery of the plastic 81 to the die and the plot 86 of the second gear pump corresponds to the delivery of the plastic 80 to the die. In this case a similarity of shrinkage, stretching and any other dimension affecting characteristics is assumed, so no compensatory change in speed is illustrated, but in the event that these characteristics differ from plastic 81 to plastic 80, then corrective action such as that described above would be called for.

Figure 6:
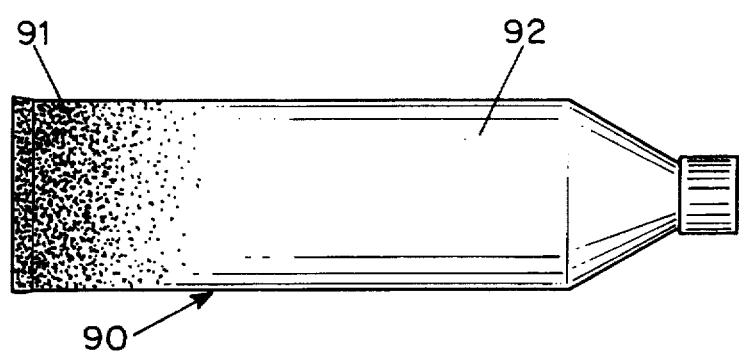
FIG. 6 is a side elevation of a tube of product made in accordance with this invention, the tube varying in a visual characteristic along its length.

FIG. 6 illustrates a squeeze tube 90, such as may package any of a wide variety of consumer products. The central body portion of the tube has been formed using the coextrusion process described above. Here, the two materials, typically plastics, differ in color or opacity, and thus shows up in the product as seen in the darker appearance in area 91 of the tube as compared to area 92. If the difference in appearance is a change in opacity, then at the end 91 of the tube the content is not visible through the tube, and in the area 92 the interior product is visible.

There are applications in which a change in cross sectional dimension of an extruded product is called for. With the control provided by the system described above, a coextrusion process can be used to make a product changing in cross sectional dimension, such as a tube, that increases and decreases in outside diameter and/or wall thickness. Control of the puller speed to gear pump speed relationship (i.e., by increasing or decreasing puller speed for example) and control of air pressure permits variation of diameter and/or thickness within the limitations of the coextrusion die.

Figure 7:
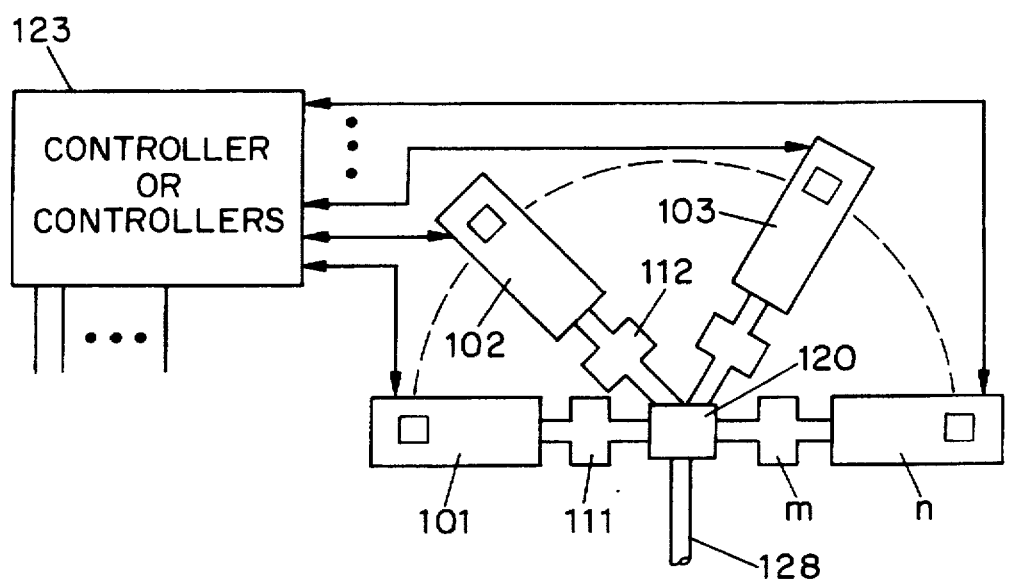
FIG. 7 is a block diagram indicating the arrangement of three or more extruders and gear pumps in a coextrusion process according to the invention.

In FIG. 7, three or more extruders 101, 102 . . . n are connected with three or more gear pumps 111, 112 . . . m, all of which are connected to a die 120. A controller (or controllers) 123 controls the extruders and pumps as well as any puller, cutter, gauges, etc. (all unshown in FIG. 7). An extrudate 128 that may be of three or more materials is thus formed and may be varied in content as desired. Moreover, it is not necessary to run all extruders, and consequently, extrudates of one, two, or more materials can be extruded.

From the above, it will be seen that an improved coextrusion process and system has been provided. The above-described preferred embodiments of the invention are exemplary only. The spirit and scope of the invention should not be understood to be limited by these. Rather, the scope of the invention is set forth in the appended claims.

I claim:

1. An extrusion system for extruding an extrudate with different materials, the proportions of which vary along the length of the extrudate, the system including:

a first extruder comprising a first output end, at least one further extruder comprising a further output end, a first gear pump connected to the first output end;

a second gear pump connected to the further output end, a die connected to receive the output of the gear pumps, and at least one controller operatively connected to the gear pumps, wherein material of a first kind is directed from the first extruder through the first gear pump to the die and material of a second kind is directed from the at least one further extruder through the second gear pump to the die, the at least one controller adapted to vary the speed of at least one of the first and second gear pumps relative to the remaining of first and second gear pumps to vary the relative content of the first and second kinds of materials in the extrudate.

2. The extrusion system according to claim 1 wherein the at least one controller is further adapted to vary the speed of both of the first and second gear pumps to vary the content of both the first and second kinds of materials of the extrudate.

3. The extrusion system according to claim 1 wherein the at least one controller is further adapted to adjust the speed of at least one of the first and second gear pumps to control cross-sectional area in the extrudate.

4. The extrusion system according to claim 3 wherein the materials extruded by the extruders vary in at least one extrudate dimension-affecting characteristic, and the at least one controller is adapted to adjust the speed of at least one of the first and second gear pumps to compensate for differing extrudate dimension-affecting characteristics of the two kinds of materials which affect a cross-sectional dimension of the extrudate.

5. The extrusion system according to claim 4 wherein the at least one controller is further adapted to provide a compensatory incremental speed decrease to the gear pump that pumps one of the different kinds of material hiring a lower shrinkage as it cools.

6. The extrusion system according to claim 1 further including means for introducing a gas into a central opening in the extrudate and wherein the at least one controller is further adapted to control the pressure of the gas to control a cross-sectional dimension of the extrudate.

7. The extrusion system according to claim 6 wherein materials having differing dimension-affecting characteristics are directed to the first and at least one further extruders and the at least one controller is adapted to control outside diameter of the extrudate.

8. The extrusion system according to claim 1 wherein each of the extenders further comprises an extruder screw having flights of a depth sufficient to prevent inertial rotation of the screw causing excessive pressure buildup between the screw and the gear pump when the gear pumps slow or stop.

9. The extrusion system according to claim 8 wherein each of the extruders further comprises an input end and wherein the extruder screw has a feed zone nearer the input end and a metering zone nearer the output end, the ratio of feed zone flight depth to metering zone flight depth being in the range of at least approximately 2 to 1.

10. The extrusion system according to claim 1 wherein the at least one controller is a programmable controller programmed to increase the speed of at least one of the first and second gear pumps while decreasing the speed of the remaining of the first and second gear pumps.

11. The extrusion system according to claim 10 wherein the speeds of the gear pumps are increased and decreased at rates providing a substantially fixed rate of delivery of extrudate from the die.

12. The extrusion system according to claim 4 wherein the at least one controller is further adapted to provide a compensatory incremental speed increase to the gear pump that pumps one of the different kinds of materials having a greater shrinkage as it cools.

13. The extrusion system according to claim 1, wherein the at least one controller is a programmable controller programmed to vary the speeds of the gear pumps to alternately supply more and less material from at least two gear pumps and maintain substantially constant the cross-sectional dimensions of the extrudate while varying the cross-sectional content of the constituent materials.

14. The extrusion system according to claim 2, wherein the at least one controller is operative to vary the speeds of the gear pumps alternately from (1) stopped to (2) a fastest speed necessary to pump all the material required to extrude the extrudate, and (3) back to stopped to produce an extrudate changing entirely from one kind of material to another kind of material.

15. The extrusion system according to claim 1 further comprising pressure sensors connected to the at least one controller and arranged to sense pressure upstream and downstream of each gear pump, and wherein the at least one controller responsive to the pressure sensors adjusts the extruder speeds to maintain a sufficient flow of materials to the gear pumps and prevent excessive pressure upstream of the gear pumps as a result of their slowing.

16. The extrusion system according to claim 4 further including an extrudate cross-sectional dimension gauge, the at least one controller being connected with the gauge and further adapted to determine a lag between the speed adjustment of one of the gear pumps and a resultant cross-sectional dimension change in the extrudate as indicated by the gauge, the at least one controller being further adapted to effect a dimension-correcting speed adjustment at a time that takes into account the lag of the location on the extrudate for which dimensional correction is being made.

17. The extrusion system according to claim 16 wherein the at least one controller comprises a display, the controller providing on the display an indication of the cross-sectional dimension measured by the gauge along a length of the extrudate, whereby the location of a dimensional change caused by a gear pump speed variation is displayed.

18. The extrusion system according to claim 16 wherein the at least one controller determines the lag by altering the speed of one of the first and second gear pumps, and continually measuring at least one cross-sectional dimension of the extrudate to locate the change therein resultant from the pump speed alterations.

19. The extrusion system according to claim 1 wherein the die is a coaxial tube coextrusion die, whereby the extrudate, due to repetitive variations of the relative speeds of the gear pumps, is formed with inner and outer distinct coaxial layers of the first and second kinds of materials respectively, the layers varying in thickness repetitively along the length of the extrudate.

20. The extrusion system according to claim 7, further including an extrudate cross-sectional dimension gauge connected with the at least one controller, the at least one controller adapted to indicate a lag between a change of pressure of the gas affecting a change in a cross-sectional dimension of the extrudate and the arrival of the change in cross-sectional dimension at the gauge, and further adapted to effect a dimension-changing gas pressure correction in advance by the lag of the location on the extrudate for which a dimensional effect of a gas pressure change is desired.

21. The extrusion system according to claim 1 wherein the at least one controller is adapted to vary the cross-sectional dimension of the extrudate to produce a multiple material extrudate having predetermined changes in at least one cross-sectional dimension.

22. The extrusion system of claim 1 wherein the at least one controller is further adapted to vary a cross-sectional dimension of the extrudate to produce a multiple material extrudate having predetermined changes in at least one cross-sectional dimension.

23. The extrusion system according to claim 6 wherein the at least one controller is further adapted to adjust the speed of at least one of the gear pumps to further compensate for the differing characteristics and bring the inside and outside diameter to desired values at points of varying material content.

24. An extrusion system for extruding an extrudate with different materials, the proportions of which vary along the length of the extrudate, including:
    a first extruder having a first gear pump at an output end thereof,
    at least one further extruder having a second gear pump at an output end thereof,
    a die connected to receive the output of the gear pumps, and
    at least one controller operatively connected to the gear pumps,
    wherein an extrudate is formed having a first portion formed exclusively of material of one kind by material of the one kind being directed from the first extruder through the first gear pump to the die,
    and a second portion formed exclusively of material of a second kind by material of the second kind being directed from the at least one further extruder through the second gear pump to the die in the absence of mixing the two kinds of material,
    the at least one controller adapted to vary the speed of at least one of the gear pumps to vary the relative output of the pumps and the content of the first and second kinds of materials in the extrudate.

25. The extrusion system according to claim 24 wherein the at least one controller is further adapted to vary the speed of both of the first and second gear pumps to vary the content of both the first and second kinds of materials of the extrudate.

26. An extrusion system for extruding an extrudate with different materials, the proportions of which vary along the length of the extrudate, including:
    a first extruder having a first gear pump at an output end thereof,
    at least one further extruder having a second gear pump at an output end thereof,
    a die connected to receive the output of the gear pumps, and
    at least one controller operatively connected to the gear pumps,
    wherein material of a first kind is directed from the first extruder through the first gear pump to the die,
    and wherein material of a second kind is directed from the at least one further extruder through the second gear pump to the die,
    the at least one controller adapted control the gear pumps to vary the speed of at least one of the gear pumps to vary the relative content of the first and second kinds of materials in the extrudate, by
        (i) momentarily changing the speed of one of the gear pumps to cause a measurable change in dimension of the extrudate,
        (ii) observing the occurrence of the change in dimension at a location downstream of the die to determine an amount of lag between the gear pump speed change and the observed change in dimension, and
        (iii) making gear pump speed adjustments in response to subsequently observed extrudate characteristics at a time determined to affect the extrudate at a desired location along its length as determined by the measured amount of lag.

27. The extrusion system according to claim 26 further comprising:
    means for introducing a gas into an opening in the extrudate at a location proximate the die,
    means for changing the amount of introduced gas sufficiently to cause a measurable change in dimension of the extrudate,
    means for observing the occurrence of the change in dimension at a location downstream of the die to determine an amount of a second lag between the introduction of gas and the observed change in dimension, and
    means for making gas introduction adjustments in response to subsequently observed extrudate characteristics at a time determined to affect the extrudate at a desired location along its length as determined by the measured amount of second lag.

28. The extrusion system according to claim 26 wherein the at least one controller is further adapted to vary the speed of at least one other of the first and second gear pumps to vary the content of at least one further material in the extrudate.

29. The extrusion system according to claim 26, wherein the at least one controller is further adapted to adjust the speed of at least one of the first and second gear pumps to control cross-sectional area in the extrudate.

30. The extrusion system according to claim 29 wherein the at least one controller is further adapted to adjust the speed of one of the first and second gear pumps to compensate for differing dimension-affecting characteristics of the two kinds of materials such as affects a cross-sectional dimension of the extrudate.

31. The extrusion system according to claim 30 wherein the at least one controller is further adapted to provide a compensatory incremental speed increase to the gear pump that pumps one of the different kinds of materials having a greater shrinkage as it cools.

32. The extrusion system according to claim 30 wherein the at least one controller is further adapted to provide a compensatory incremental speed decrease to the gear pump that pumps one of the different kinds of material having a lower shrinkage as it cools.

33. The extrusion system according to claim 30 wherein the at least one controller is further adapted to make a compensating speed change at a time that precedes by the determined lag the emergence from the die of that location on the extrudate where the compensatory change is to occur.

* * * * *

UNITED STATES PATENT AND TRADEMARK OFFICE
CERTIFICATE OF CORRECTION

PATENT NO. : 5,695,789
DATED : December 9, 1997
INVENTOR(S) : Holton E. Harris

It is certified that error appears in the above-indentified patent and that said Letters Patent is hereby corrected as shown below:

First Page, Item 73 , "Norwalk" should read --East Norwalk--;
Col. 7, line 17, "substantial" should read --substantially--;
Col. 8, line 38, "varies " should read --varies.--;
Col. 11, line 56, "hiring" should read --having--;
Col. 12, line 2, "extenders" should read --extruders--;
Col. 13, line 14, "affecting" should read --effect--;
Col. 14, line 23, "adapted" should read --adapted to--;
Col. 14, line 36, "affect" should read --affect--;
Col. 15, line 4, "dimension-affecting" should read --dimension-effecting--;
Col. 15, line 5, "affects" should read --effects--.

Signed and Sealed this

Seventh Day of July, 1998

Attest:

BRUCE LEHMAN

Attesting Officer

Commissioner of Patents and Trademarks